(12) United States Patent
Fellhauer et al.

(10) Patent No.: US 6,655,714 B2
(45) Date of Patent: *Dec. 2, 2003

(54) GAS BAG RESTRAINT DEVICE

(75) Inventors: Joachim Fellhauer, Nilkheim (DE); Ralph Neupert, Kleinwallstadt (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 28 days.

This patent is subject to a terminal disclaimer.

(21) Appl. No.: 10/036,233

(22) Filed: Dec. 26, 2001

(65) Prior Publication Data

US 2002/0084641 A1 Jul. 4, 2002

(30) Foreign Application Priority Data

Dec. 28, 2000 (DE) ..................... 200 22 018 U

(51) Int. Cl.$^7$ .............................................. B60R 21/16
(52) U.S. Cl. ................................. 280/743.1; 280/731
(58) Field of Search .......................... 280/743.1, 743.2, 280/731, 732, 729

(56) References Cited

U.S. PATENT DOCUMENTS

| | | | | |
|---|---|---|---|---|
| 3,618,979 A | * | 11/1971 | Gulette | 280/731 |
| 4,828,286 A | * | 5/1989 | Fohl | 280/731 |
| 5,125,682 A | * | 6/1992 | Hensler et al. | 280/730.1 |
| 5,480,184 A | * | 1/1996 | Young | 280/731 |
| 6,254,121 B1 | * | 7/2001 | Fowler et al. | 280/729 |
| 6,431,599 B1 | * | 8/2002 | Bohn | 280/743.1 |
| 6,505,851 B2 | * | 1/2003 | Frisch | 280/728.3 |
| 6,517,100 B2 | * | 2/2003 | Frisch | 280/728.2 |
| 6,536,801 B2 | * | 3/2003 | Frisch | 280/743.1 |
| 6,540,254 B2 | * | 4/2003 | Bieber et al. | 280/732 |
| 6,554,317 B2 | * | 4/2003 | Lorenz et al. | 280/743.1 |
| 6,588,798 B2 | * | 7/2003 | Bohn et al. | 280/743.1 |
| 2002/0005632 A1 | * | 1/2002 | Bohn et al. | 280/728.3 |

* cited by examiner

Primary Examiner—Paul N. Dickson
Assistant Examiner—Deanna Draper
(74) Attorney, Agent, or Firm—Tarolli, Sundheim, Covell & Tummino L.L.P.

(57) ABSTRACT

The invention relates to a gas bag restraint device including a gas bag module which has a gas bag wall. The gas bag wall has a front wall upon which an occupant to be restrained can impact in a case of restraint and has a depression defined by a ring-shaped gas bag wall portion. The depression is generated in that a center portion of the front wall is attached to the module and is prevented from movement when the gas bag is inflated. A holder is provided at the ring-shaped gas bag wall portion that keep parts of the ring-shaped gas bag wall portion, which get in contact with each other when the gas bag is inflated, in contact with each other in a fully inflated condition of the gas bag, and at least partly close the depression.

7 Claims, 1 Drawing Sheet

GAS BAG RESTRAINT DEVICE

TECHNICAL FIELD

This invention relates to a gas bag restraint device.

BACKGROUND OF THE INVENTION

Known gas bag restraint devices comprise a gas module, which has a gas bag with a gas bag wall which gas bag wall comprises a front wall upon which the occupant to be restrained can impact in the case of restraint, and which front wall has a depression formed by a ring-shaped gas bag wall portion, in that a center portion of the front wall is attached to the module and is prevented from a free, preferably any movement when the gas bag is inflated. Such ring-shaped gas bags have a large impact area that can be presented to an occupant to be restrained, as they are first of all deployed radially towards outside.

BRIEF SUMMARY OF THE INVENTION

The invention provides a gas bag restraint device with a depression and, nevertheless, a large and increased impact area in the region of the depression. This is achieved in a gas bag restraint device which comprises a gas bag module which has a gas bag with a gas bag wall. The gas bag wall comprises a front wall upon which an occupant to be restrained can impact in a case of restraint. The front wall has a depression defined by a ring-shaped gas bag wall portion. The depression is generated in that a center portion of the front wall is attached to the module and is prevented from a free, preferably any movement when the gas bag is inflated. Holding means are provided at the ring-shaped gas bag wall portion that keep parts of the ring-shaped gas bag wall portion contacting each other when the gas bag is inflated in contact with each other in a fully inflated condition of the gas bag, and at least partly close the depression. Despite these holding means, the gas bag can first move outwards during deployment and, in so doing, assume a toroidal shape. However, there is usually obtained a dynamic movement, i.e. the ring-shaped chamber to be filled with gas with the ring-shaped gas bag wall portion defining the depression collapses towards inside, so as to at least partly close the depression. After the first contact of parts of the ring-shaped gas bag wall portion, there occurs in prior art devices a movement radially towards outside, so that the depression is exposed again. In the device proposed, however, the contact is maintained by the holding means when parts of the ring-shaped gas bag wall portion come together, so that the exposed cross-sectional area of the depression at least as seen from the front wall is smaller than in prior art devices. Preferably, the depression is even closed completely.

In accordance with the preferred embodiment, the holding means are disposed at the entrance of the depression, i.e. directly at the transition from the front wall portion facing the occupant and its portion defining the depression (center portion plus ring-shaped gas bag wall portion).

The holding means are usually disposed at opposite parts of the ring-shaped gas bag wall portion and then connect these parts.

The holding means are, for instance, designed as adhesive means or as a hook and eye closure such as VELCRO®.

In accordance with the preferred embodiment, the depression is closed by the holding means such as to form a slot when the gas bag has been inflated.

Another advantage, for instance of the hook and eye closure such as VELCRO®, consists in that the same can be used for fixing the air bag in a folding machine while the gas bag module is assembled.

To ensure the contact of the parts of the gas bag wall, limiting straps are provided adjacent the depression in accordance with the preferred embodiment, which limiting straps limit the depth of the gas bag and define the depth of the depression. As a result, the ring-shaped gas bag wall portion need not effect the limitation in depth and can bulge radially inwards.

DETAILED DESCRIPTION OF THE PREFERRED EMBODIMENTS

Figure 1:
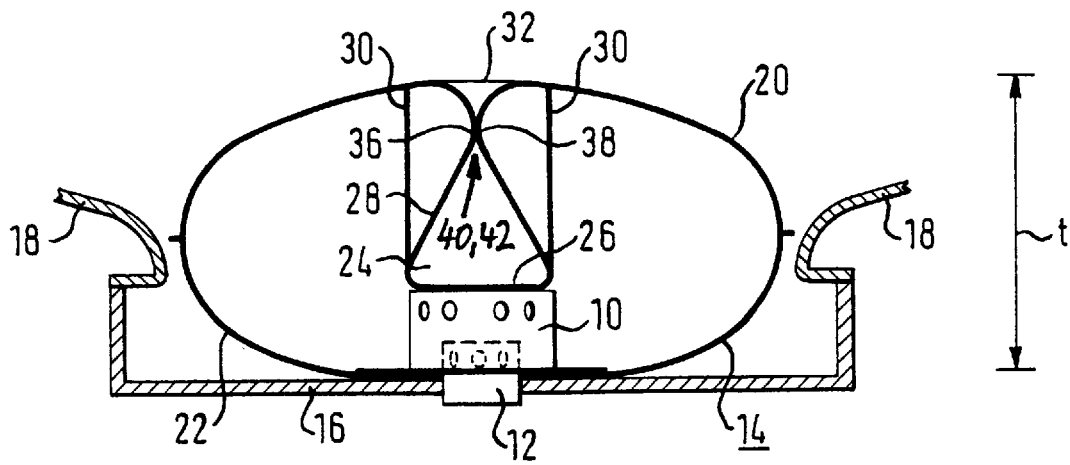
FIG. 1 shows a cross-sectional view of the gas bag restraint device according to the invention, with the gas bag completely inflated.

FIG. 1 shows a gas bag restraint device comprising a gas bag module, which has a gas generator 12 accommodated in a diffuser 10, a front gas bag 14, protecting the occupant in case of a front crash, and a module housing 16 which is closed by a cover 18. The gas bag 14 is formed by a gas bag wall which has several portions, namely a front wall 20 with a ring-shaped portion facing the occupant to be restrained and being contacted in the case of restraint, and a rear wall 22 facing away from the occupant. The front wall 20 has a centrally arranged deep depression 24, which is formed in that a center portion 26 of the front wall is permanently attached to the diffuser 10—also in the inflated condition. The depression 24 is defined by a ring-shaped gas bag wall portion 28 and the center portion 26. There is provided no separate wall closing the depression in the region of the front wall. To ensure, however, that the gas bag is closed, two broad limiting straps 30 arranged parallel with respect to each other are provided adjacent the ring-shaped gas bag wall portion and close to the entrance 32 of the depression 24. The limiting straps 30 are attached on the one hand to the front wall 20 close to the entrance 32 of the depression 26 and on the other hand to the center portion 26 of the gas bag wall.

Figure 2:
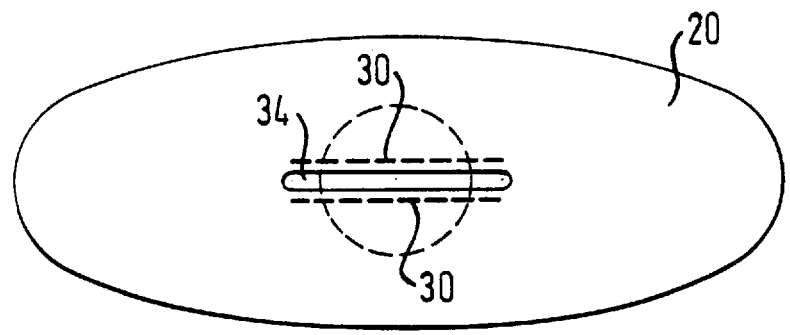
FIG. 2 shows a top view of the front wall of the inflated gas bag as shown in FIG. 1, as seen from the occupant to be restrained.

In the inflated condition, the limiting straps 30 determine the depth t of the gas bag and also the depth of the depression 24. The ring-shaped gas bag wall portion 28 need not contribute to this limitation in depth and hence can bulge radially inwards, as is shown in FIG. 1. In this way, the depression 24, which is possibly open without the limiting straps 30, is largely or even completely closed in the region of the entrance 32 of the depression 24. There is obtained the slot 34 shown in FIG. 2. Opposite parts 36, 38 of the gas bag wall portion 28, which contact each other, are connected by holding means, so that even during the dynamic process of inflation the depression is not completely exposed to the occupant.

Figures 3A, 3B:
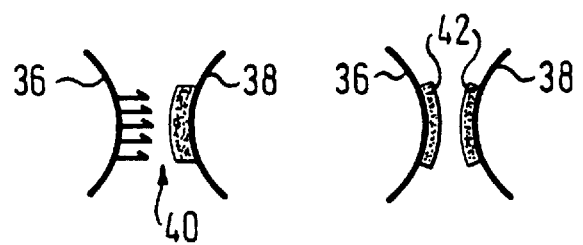
FIGS. 3a and 3b show portions of the ring-shaped gas bag wall which during inflation are held against each other by various holding means.

The holding means are shown in FIGS. 3a and 3b. As shown in FIG. 3a, a hook and eye closure such as VELCRO® 40 is provided on the outside of the gas bag wall portion 28 in the region of the parts 36, 38 of the gas bag wall portion, which hook and eye closure such as VEL-CRO® holds the parts 36, 38 together. In FIG. 3a like, incidentally, in FIG. 3b as well, the parts 36, 38 are shown briefly before their contact. In FIG. 3b, an adhesive applied to the outside of the parts 36, 38 or an adhesive tape 42 is provided as holding means.

When folding the gas bag into the module housing 36, the holding means may serve as holder of the gas bag.

The gas bag has a ring-shaped chamber which is inflated by the gas of the gas generator and which circumscribes the depression 24. The depression, however, is not to be filled with the gas of the gas generator.

The gas bag restraint device is arranged in a steering wheel or behind a dashboard.

What is claimed is:

1. A gas bag restraint device, comprising a gas bag module which has a gas bag with a gas bag wall which gas bag wall has a front wall upon which an occupant to be restrained can impact in a case of restraint, the front wall having a depression defined by a ring-shaped gas bag wall portion, said depression being generated in that a center portion of said front wall is attached to said module and is prevented from a movement when said gas bag is inflated, holding means being provided at said ring-shaped gas bag wall portion that keep parts of said ring-shaped gas bag wall portion, which get in contact with each other when said gas bag is inflated, in contact with each other in a fully inflated condition of said gas bag, and at least partly close said depression.

2. The gas bag restraint device as claimed in claim 1, wherein said holding means are disposed at an entrance of said depression.

3. The gas bag restraint device as claimed in claim 1, wherein said holding means connect opposite parts of said ring-shaped gas bag wall portion with each other.

4. The gas bag restraint device as claimed in claim 1, wherein adhesive holding means are provided.

5. The gas bag restraint device as claimed in claim 1, wherein said holding means are a hook and eye closure such as VELCRO®.

6. The gas bag restraint device as claimed in claim 1, wherein, when said gas bag has been inflated, said depression is closed by said holding means such as to form a slot.

7. The gas bag restraint device as claimed in claim 1, wherein limiting straps are provided adjoining said depression, said limiting straps limiting a movement of said front wall close to said entrance of said depression during inflation.

\* \* \* \* \*